United States Patent [19]
Marsh

[11] 3,766,725
[45] Oct. 23, 1973

[54] FARM CROP HANDLING APPARATUS
[76] Inventor: Preston L. Marsh, Rt. 1, Hope, Mich. 48628
[22] Filed: Apr. 27, 1972
[21] Appl. No.: 248,158

Related U.S. Application Data
[63] Continuation-in-part of Ser. No. 77,428, Oct. 2, 1970.

[52] U.S. Cl. .................................. 56/364, 56/372
[51] Int. Cl. ........................................... A01d 43/02
[58] Field of Search ..................... 56/364, 372, 14.4, 56/16.4, 14.5

[56] References Cited
UNITED STATES PATENTS
| | | | |
|---|---|---|---|
| 2,133,143 | 10/1938 | Innes | 56/364 |
| 2,286,095 | 6/1942 | Innes | 56/364 |
| 2,644,292 | 7/1953 | Oberholtz et al. | 56/364 |

Primary Examiner—Antonio F. Guida
Attorney—Learman & McCulloch

[57] ABSTRACT

Farm crop handling apparatus comprising a rotatable crop pickup assembly, including a plurality of longitudinally spaced, radially extending, pickup tines supported by a driven hub, a freely rotatable stripper drum, receiving the hub of the pickup assembly and having a plurality of longitudinally spaced openings therein receiving the pickup tines which extend through the openings and move between radially outer positions to pick up crop and radially inner positions to deposit the lifted crop on the stripper drum as the drum and pickup assembly are rotated, and a plurality of circumferentially spaced, flexible coupling members connected between the pickup assembly and the drum for driving the crop stripper drum when the pickup assembly is driven.

11 Claims, 4 Drawing Figures

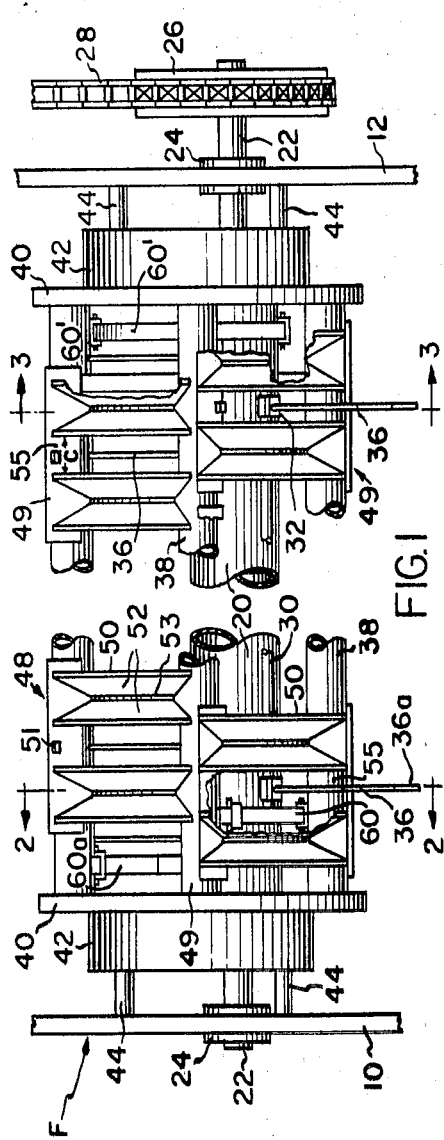
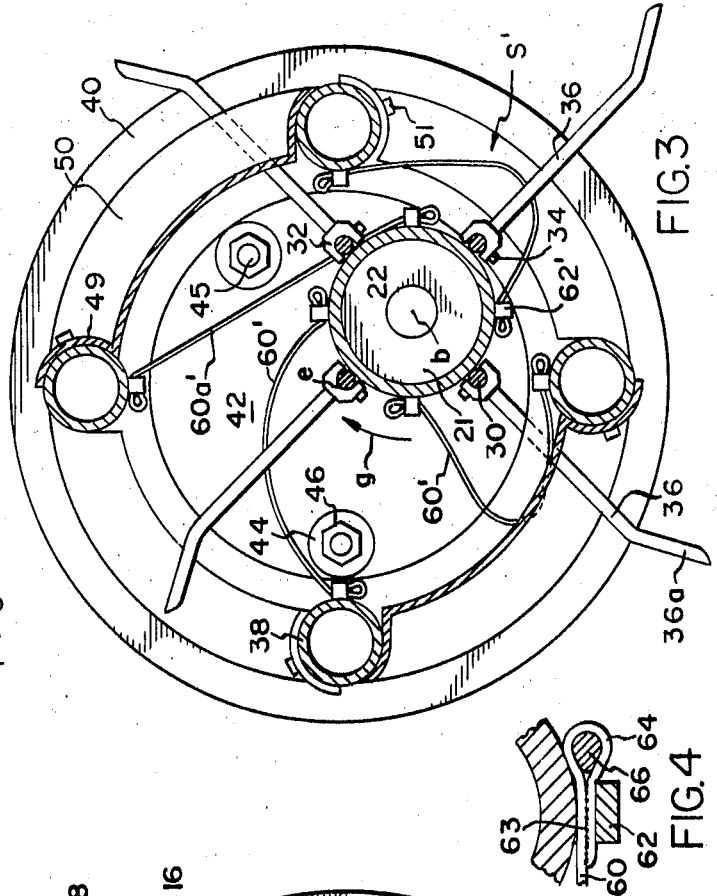
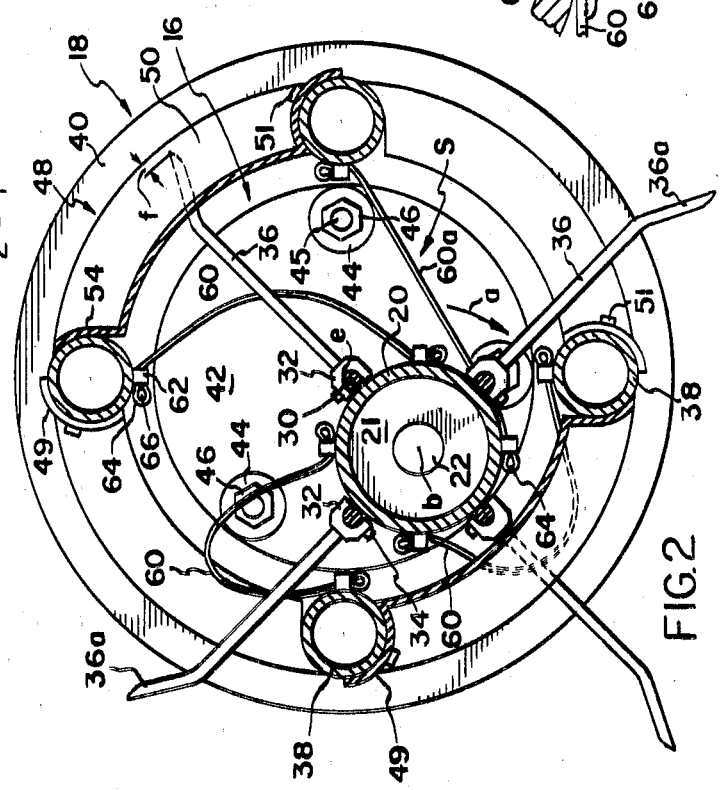

FARM CROP HANDLING APPARATUS

FIELD OF THE INVENTION

This invention is a continuation-in-part application of applicant's copending patent application, Ser. No. 77,428, filed in the United States Patent Office on Oct. 2, 1970.

This invention relates to a driven farm crop pickup tine assembly and a stripper drum for stripping the crop therefrom and more particularly to apparatus for positively coupling rotation of the pickup assembly to the stripper drum.

BACKGROUND OF THE INVENTION

In the above referenced application, which is incorporated herein by reference, applicant has disclosed farm crop handling apparatus including a stripper drum having a plurality of axially spaced openings therein for receiving a plurality of radially extending pickup tines which move therethrough between radially protracted and retracted positions for picking up and depositing crops on the stripper drum as the drum and pickup tines are rotated.

In the embodiment disclosed in FIG. 5 of the parent application, wherein the pickup tines drive the stripper drum, if the stripper drum becomes caked with mud and becomes difficult to drive, it may occur that the pickup tines will escape through the openings in the outer surface of the drum and be moved to positions entirely within the stripper drum, thus disabling the machine. In the embodiment disclosed in FIGS. 1, 2 and 4 of the referenced application, the stripper drum and the pickup assembly are individually driven by sprocket wheels and chains, but, if the chains become loose with wear and skip or jump the spockets, the stripper drum and pickup tines may get "out of time" causing the tines to move inwardly of the stripper drum assembly.

When the tines are wrapped interiorly of the stripper drum assembly, it is apparent that the machine must be stopped and the pickup assembly dismantled so that the tines can again be positioned in the drum openings. Such repairs cause substantial down-time. The harvesting of crops is weather-dependent and if a farmer's machine is out of commission for even short periods during harvesting time, the unharvested crop can represent a substantial loss and thus, it is important that a pickup assembly be provided which will positively drive the stripper drum in time with the pickup tine assembly to preclude the pickup tines from inadvertently moving completely interiorly of the crop stripping assembly. Accordingly, it is an object of the present invention to provide farm crop handling apparatus having a pickup tine assembly positively coupled to a rotatable crop stripping assembly.

It is another object of the present invention to provide crop handling apparatus including a pickup tine assembly having crop pickup tines radially movable through openings in a stripper drum assembly and a plurality of flexible coupling members connected between the pickup tine assembly and the stripper drum for positively successively driving the drum when the pickup tine assembly is rotated.

Other objects and advantages of the present invention will become apparent to those of ordinary skill in the art as the description thereof proceeds.

SUMMARY OF THE INVENTION

Farm crop handling apparatus comprising: crop lifting means rotatable about a first longitudinal axis for lifting crop; crop stripping means rotatable about a second longitudinal axis spaced from the first axis for stripping the crop from the crop lifting means when the crop lifting means is rotated; the crop stripping means including a plurality of longitudinally spaced openings; the crop lifting means including support means interiorly of the stripping means and a plurality of radially outwardly extending pickup tines on the support means radially movable through said openings between radially outer positions to pick up crop and radially inner positions to deposit the picked-up crop on the crop stripping means as the crop lifting means and crop stripping means are rotated; means for rotating the crop lifting means about the first axis; and flexible coupling means reactable between the crop lifting means and the stripping means for rotating the crop stripping means about the second axis as the stripping means is rotated about the first axis.

The present invention may more readily be described by reference to the accompanying drawings in which:

FIG. 1 is a top plan view of crop handling apparatus constructed according to the present invention, parts of the apparatus being broken away to more clearly illustrate underlying portions thereof;

FIG. 2 is an enlarged sectional, end view taken along the line 2—2 of FIG. 1, and ilustrating the coupling members for coupling the pickup tine assembly to the stripper drum when the pickup tine assembly is driven in one direction of rotation;

FIG. 3 is an enlarged, opposite sectional end elevational view, taken along the line 3—3 of FIG. 1, and illustrating the coupling members for coupling the pickup tine assembly to the stripper drum when the pickup tine assembly is rotated in a reverse direction; and FIG. 4 is a greatly enlarged sectional end view, illustrating one of the flexible coupling members coupled to the stripper drum.

GENERAL DESCRIPTION OF THE PREFERRED EMBODIMENT

Pickup apparatus constructed according to the present invention is generally designated 14 and is particularly adapted for use with a windrowing machine of the type disclosed in the referenced patent application. The frame of a typical windrowing machine is generally designated F and includes a pair of side frame members 10 and 12 for supporting the pickup apparatus 14. The pickup apparatus 14 includes a pickup assembly, generally designated 16, and a stripper drum assembly, generally designated 18.

The pickup assembly 16 includes a rotatable tine mounting cylinder 20 having end plates 21 fixed to reduced stub shafts 22 journaled in a pair of frame supported bearings 24. A sprocket wheel 26, which is fixed to the end of one stub shaft 22, has a drive chain 28 trained therearound, for normally driving the pickup assembly in the direction of the arrow a (FIG. 2) to pick up crop and propel it rearwardly while the drum moves forwardly with the windrowing machine. The tine mounting cylinder 20 includes a plurality of longitudinally spaced, increased diameter tine mounting lugs 30 thereon for receiving tine mounting clevises 32 removably secured thereto by removable locking pins 34. The clevis members 32 are formed of resilient material such as rubber, and each mounts a radially outwardly extending tine 36 having a terminal end portion 36a angled forwardly in the direction of rotation indicated by the arrow a. The tines 36 are longitudinally disposed in rows on the cylinder 20 and the tines of each row are longitudinally staggered with the tines of an adjacent row to facilitate crop pickup. The rotational axis of the tine assembly 16 is designated b.

The stripper drum assembly 18 is constructed generally identically to the stripper drum D disclosed in the above referenced application and includes a plurality of longitudinally extending, parallel mounting rods 38, welded or otherwise suitably secured at their ends to a pair of annular end plates 40. Each of the end plates 40 includes an annular, axially extending flange 42 rotatably supported on a plurality of circumferentially spaced roller bearing members 44 which are journaled on support bolts 45 that are connected to the frame members 10 and 12 by nuts 46.

Connected to each of the parallel mounting rods 38 of the stripper drum assembly 18 is a plurality of longitudinally spaced, circumferentially extending trough sections 48 including curved mounting plates 49, secured to the rods 38 by a plurality of bolts 51 threadedly received in suitable tapped openings provided in the rods 38. Each trough section 48 mounts at least a pair of circumferentially extending, curvilinear, V-shaped trough members 50 each including a pair of curvilinear plates 52 joined at their radially inwardly disposed apex 53 and diverging radially outwardly. The radially outer edge portions 52a of the plates 52 of the adjacent troughs 50 are spaced apart a distance $c$ to define openings 55 receiving the crop pickup tines 36. The trough ends remote from the bolts 51 are closed by end walls 54 having a curvature corresponding to the curvature of the adjacent mounting rod 38 so as to be supported thereby when the trough sections 48 are bolted in the positions illustrated in the drawing. The troughs 50 serve to collect grain or seed which may be shelled while the crop is being lifted by the tine assembly 16 and to propel the shelled grain rearwardly to be suspended in the grain stocks positioned in the window. It should be realized that the pickup assembly 14 can be utilized with a grain combine in which instance the grain collected by the troughs 50 is propelled directly onto the feeder table of the combine and hence much otherwise wasted grain is saved to increase the yield of the crop being harvested.

In addition to the increased crop yield resulting from the use of apparatus constructed according to the present invention, the radially outer trough edge portions 52a present a substantially decreased external surface area on which mud can adhere when the crop is being harvested. The discontinuous outer surface of the stripper drum further inhibits the collection of mud on the drum and thus reduces the power required to drive the drum.

The rotational axis $e$ of the drum assembly 18 is offset from, but parallel to, the axis $b$ of the pickup assembly 16. When the pickup assembly 16 and stripper drum assembly 18 are rotated, the tines 36 follow a path which is eccentric relative to the path of the drum 18 so that the tines 36 will protrude to their maximum length along the front and lower side of the drum assembly 18, as viewed in FIG. 2 to pick up the crop and carry it around the stripper drum assembly 18 and then be retracted inwardly through the slots 55 in the stripper drum assembly 18 along the top and rear side thereof to deposit the crop on the stripper drum 18. As illustrated in FIG. 2, the terminal portions 36a of the tines 36 are spaced a distance $f$ inwardly of the outer peripheral edge portions 52a of the trough-shaped members 50 when the tines 36 pass along the upper and rear portions of the drum 18. If the tines 36 are obstructed or deflected sidewisely from their normal positions, the resilient mounting clevises 32 would also deflect and the tines 36 would be guided radially outwardly by the walls 52 as the tines 36 move radially outwardly.

For rotating the drum assembly 18 as the pickup assembly 16 is driven by the drive chain 28, in the direction of the arrow $a$ (FIG. 2), a coupling system S is provided and comprises a plurality of generally circumferentially spaced, flexible straps 60 connected between the rotating cylinder 20 of the pickup assembly 16 and the longitudinally mounting rods 38 of the drum assembly 18. The straps 60 are all of the same length and may comprise woven fabric, of the type conventionally used in automobile seat belts. The ends 64 of the straps 60 are received in circumferentially spaced, U-shaped mounting members 62 connected to the longitudinal stripper drum mounting bars 38 and the outer surface of the pickup assembly tine mounting cylinder 20. The ends 64 of the straps 60 are folded over on themselves and stitched together at 63 to form a loop which receives a wedge 66, after the loops are passed through the mounting members 62, to preclude them from being withdrawn through the mounting members 62. Alternate ones of the brackets 62 and straps 60 are axially spaced from the intermediate brackets 62 and straps 60 (see FIG. 2) so that the adjacent straps 60 do not become intertwined or tangled as the pickup apparatus is rotating.

Because the rotational axis $b$ of the pickup assembly 16 is offset from the axis $e$ of the stripper assembly, only one web, as shown at 60a, will be in tension at any one time. The remaining ones of the straps 60 will be limp at this time. As the drum assembly and pickup assembly continue to rotate, successive ones of the straps 60 will be moved into a position of tension to drive the drum.

To unwind crop which sometimes becomes wound on the pickup assembly and stripper assembly, the pickup assembly and stripper assembly are driven in a reverse direction of rotation, represented by the arrow $g$ (FIG. 3). Apparatus, generally designated S', is provided for positively coupling reverse rotation of the pickup assembly to the stripper drum. The apparatus S' is generally identical to the drive system S except that the drive system S and S' are of opposite hand. Parts of the system S' corresponding to like parts of the drive system S, are identified with identical numerals followed by a prime designation. The drive system S' includes straps 60' which are connected to mounting members 62' on the tine mounting cylinder 20 and the stripper drum mounting bars 38 so that at least one of the straps 60' will be in tension immediately driving the drum when the drum assembly 18 is reversely driven. If the drive system S' were not provided, the pickup assembly 16 would be driven in the reverse direction through a substantial distance before the stripper drum would be reversely driven. The straps 60 and 60' may suitably comprise nylon webbings, roller chains or other limp or flaccid members suitable for connecting the pickup and stripper assemblies. It should be realized, of course, that the straps 60 and 60' could extend along the entire length of the drum and that any number of straps could be utilized to reduce the pulsations and provide a smoother drive.

THE OPERATION

The drive chain 28 is driven to rotate the pickup assembly 16 in the direction of the arrow a about its rotational axis b. The pickup tines 36 on the tine assembly 16 protrude through the openings 55, between the troughs 50 along the front and lower portion of the stripping drum 18, to lift the scattered crop and move it rearwardly or around the upper portion of the stripper drum assembly 18. Because the tine assembly 16 is rotatable about an axis b offset from the axis e of the stripper drum 18, the tines 36 move in an eccentric path of travel relative to the circular path of movement of the stripper plates 58 so as to be retracted through the slots 55 along the top and rear portions of the drum assembly 18 to deposit the scattered crop thereon. The webs 60 successively come into positions of tension as illustrated at 60a in FIG. 2 to drive the drum assembly 18 as the pickup assembly 16 is being rotated in the direction of the arrow a. The rotating drum 18 propels the crop deposited thereon rearwardly for further processing.

If the pickup assembly is driven in the reverse direction g (FIG. 3), the straps 60' at the opposite end of the pickup assembly successively move to positions of tension to drive the stripper drum in the opposite direction.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Farm crop handling apparatus comprising:
longitudinally extending crop lifting means rotatable about its longitudinal axis for lifting crop;
longitudinally extending crop stripping means rotatable about its longitudinal axis for stripping the crop from said crop lifting means when said crop lifting means is rotated;
said crop stripping means including a plurality of longitudinally spaced openings;
said crop lifting means including support means disposed interiorly of said stripping means, and a plurality of radially outwardly extending, circumferentially and longitudinally spaced pickup tines on said support means successively movable in said openings between radially outer positions to pick up crop and radially inner positions to deposit the picked up crop on said crop stripping means as said crop lifting means and crop stripping means are rotated;
means for rotating said crop lifting means about its axis; and
flexible coupling means reactable between said crop lifting means and said crop stripping means for rotating said crop stripping means and said crop lifting means in substantial unison in said one direction and positively interrupting rotation of said tines in said one direction relative to said crop stripping means as said crop lifting means is rotated about its said axis in said one direction.

2. The apparatus set forth in claim 1 wherein said flexible coupling means comprises a p'urality of generally circumferenJially spaced, flexible couplIng members successively movable between collapsed, inoperative positions, and elongated draft positions in tension between said crop lifting means and said crop stripping means for successively applying a rotary force to the crop stripping means when the crop lifting means is rotated in one direction of rotation.

3. The apparatus set forth in claim 2 wherein said flexible coupling means comprises an additional plurality of generally circumferentially spaced, flexible coupling members successively movable between collapsed inoperative conditions and elongated draft conditions in tension between said crop lifting means and said crop stripping means to draw the crop stripping means when the crop lifting means is rotated in the opposite direction of rotation, at least one of said first-mentioned plurality of said coupling members always being in tension when said crop stripping means is rotated in said one direction and at least one of said additional plurality of coupling members always being in tension when said crop stripping means is rotated in the opposite direction to provide immediate, positive driving of said crop stripping means when said crop lifting means rotates in either direction.

4. The apparatus set forth in claim 2 wherein at least a portion of said flexible coupling members are axially spaced from adjacent coupling members to preclude the adjacent coupling members from being interwound with each other as the crop lifting means and crop stripping means are rotated.

5. The apparatus set forth in claim 4 wherein said coupling members comprise a plurality of flexible straps disposed interiorly of said stripping means, and circumferentially spaced means is provided for removably coupling said straps to said lifting means and said stripping means.

6. The apparatus of claim 1 wherein the axis of rotation of said crop stripping means is spaced from the axis of rotation of said crop lifting means.

7. Farm crop handling apparatus including:
crop lifting means rotatable about a longitudinal axis for lifting crop;
generally cylindrical, rotatable crop stripping means, capable of limited rotary movement relative to said crop lifting means, for stripping the crop from said crop lifting means when said crop lifting means is rotated;
said crop stripping means including a plurality of longitudinally spaced openings;
said crop lifting means including support means disposed interiorly of said stripping means, and a plurality of pickup tines on said support means movable in said openings between radially outer positions to pick up crop and radially inner positions to deposit the picked up crop on said crop stripping means as said crop lifting means and said crop stripping means are rotated;
means for rotating said crop lifting means about its axis in one direction; and means disposed completely interiorly of said crop stripping means always drivingly connected between said crop lifting means and said stripping means for rotatably driving said crop stripping means in said one direction to positively limit rotation of said tines in said one direction relative to said crop stripping means as said crop lifting means is rotated about its said axis in said one direction.

8. The apparatus set forth in claim 7 wherein said driving means comprises a plurality of generally circumferentially spaced, flexible coupling members.

9. Farm crop handling apparatus comprising:
crop lifting means rotatable about an axis;
crop stripping means, capable of limited rotary movement relative to said crop lifting means, rotatable about an axis and operable in response to rotation in one direction of said crop lifting means to strip crop therefrom;
means for rotating said crop lifting means in said one direction; and
a plurality of flexible coupling members connecting said crop lifting means and said crop stripping means for successively applying a rotary force on said crop stripping means and positively interrupting rotation of said crop lifting means in said one direction relative to said crop stripping means in response to rotation of said crop lifting means in said one direction.

10. The farm crop handling apparatus set forth in claim 9 including an additional plurality of flexible coupling members connecting said crop lifting means and said crop stripping means for successively applying a rotary force to said crop stripping means in response to rotation of said crop lifting means in an opposite direction.

11. The farm crop handling apparatus set forth in claim 10 wherein one of said first plurality of coupling members is substantially always in tension whenever said crop lifting means is rotated in said one direction and one of said additional plurality of a flexible coupling members is substantially always in tension whenever said crop lifting means is rotated in the opposite direction.

* * * * *